United States Patent
Ohno et al.

(10) Patent No.: US 6,540,805 B2
(45) Date of Patent: Apr. 1, 2003

(54) HIGH-PERFORMANCE FILTER FOR INTAKE AIR FOR GAS TURBINE, AND FILTER UNIT USING SUCH FILTER FOR INTAKE AIR FOR GAS TURBINE

(75) Inventors: Katsuhiro Ohno, Yuki (JP); Fumio Nakajima, Yuki (JP); Hitoshi Niinuma, Yuki (JP)

(73) Assignee: Nippon Muki Co., Ltd., Tokyo (JP)

( * ) Notice: Subject to any disclaimer, the term of this patent is extended or adjusted under 35 U.S.C. 154(b) by 0 days.

(21) Appl. No.: 09/836,859

(22) Filed: Apr. 18, 2001

(65) Prior Publication Data

US 2002/0184862 A1 Dec. 12, 2002

(30) Foreign Application Priority Data

Mar. 29, 2001 (JP) ........................................ 2001-097549

(51) Int. Cl.$^7$ ............................................... B01D 46/10
(52) U.S. Cl. ..................... 55/486; 55/385.3; 55/487; 55/498; 55/521; 95/286; 95/287
(58) Field of Search ..................... 55/485, 486, 487, 55/498, 502, 510, 385.3, 497, 500, 521; 95/286, 287

(56) References Cited

U.S. PATENT DOCUMENTS

| | | | |
|---|---|---|---|
| 6,019,809 A | * 2/2000 | Kahlbaugh et al. | 55/498 |
| 6,099,606 A | * 8/2000 | Miller et al. | 55/498 |
| 6,152,978 A | * 11/2000 | Lundquist | 55/385.1 |
| 6,171,684 B1 | * 1/2001 | Kahlbaugh et al. | 55/527 |
| 6,315,805 B1 | * 11/2001 | Strauss | 55/486 |
| 6,348,085 B1 | * 2/2002 | Tokar et al. | 55/498 |
| 6,350,291 B1 | * 2/2002 | Gieseke et al. | 55/498 |
| 6,368,374 B1 | * 4/2002 | Tokar et al. | 55/498 |

* cited by examiner

Primary Examiner—David A. Simmons
Assistant Examiner—Minh-Chau T. Pham
(74) Attorney, Agent, or Firm—Armstrong, Westerman & Hattori, LLP

(57) ABSTRACT

A high-performance filter for an intake air for a gas turbine according to the present invention includes a low-efficiency filter media and a high-efficiency filter media superposed closely on each other in the named order from an upstream side in a direction of an air flow. Each of the filter media is formed with a filtering area of 20 to 35 m$^2$. The filter media having a filtration efficiency of 40 to 70% for particles having a particle size of 0.3 $\mu$m is disposed as a layer upstream in the air flow direction, and the filter media having a filtration efficiency of 90 to 99.99% for particles having a particle size of 0.3 $\mu$m is disposed as a downstream layer. In addition, a filter unit according to the present invention is made using the above filter, Thus, even when the filter unit is used for atmospheric dusts including a high concentration of dusts having a particle size of 0.3 to 0.5 $\mu$m, a life of 8,000 hours or more, and the deposition of the atmospheric dusts in an air compressor or the like in a conventional gas turbine plant can be alleviated, thereby preventing a reduction in power-generating output and ensuring that it is unnecessary over a long period of time to carry out the washing or cleaning of the air compressor and the like and the replacement of the filter. In addition, the filter unit can be placed in a reduced space.

4 Claims, 3 Drawing Sheets

HIGH-PERFORMANCE FILTER FOR INTAKE AIR FOR GAS TURBINE, AND FILTER UNIT USING SUCH FILTER FOR INTAKE AIR FOR GAS TURBINE

BACKGROUND OF THE INVENTION

1. Field of the Invention

The present invention relates to a filter unit for an intake air for a gas turbine, which is designed to remove atmospheric dusts, whereby the deposition of the dusts in an air compressor or the like in a gas turbine plant can be alleviated, thereby preventing a reduction in power-generating output and ensuring that it is unnecessary over a long period to carry out the washing or cleaning of the air compressor and the like and the replacement of a filter, and more particularly, to a high-performance filter for an intake air for a gas turbine and a filter unit using such high-performance filter for an intake air for a gas turbine, which can be placed in a reduced space.

2. Description of the Related Art

As shown in FIG. 8, a gas turbine a draws the open air b during operation thereof. Atmospheric dusts such as fine dusts, rainwater, mists, fine carbon particles in an exhaust gas, salt particles and the like are in suspension in the open air b, Therefore, there is encountered a problem such atmospheric dusts cause the corrosion and pollution of the inside of the gas turbine, and are deposited particularly on an air compressor c to produce a reduction in performance of the air compressor c to reduce the power-generating output. To previously prevent the drawing-in of the atmospheric dusts, a dust collector or a filter unit e for mechanically separating off the atmospheric dusts from the air to clean the air is placed in an air intake port d in the gas turbine a. The filter unit e is formed into two stages of a coarse filter f made of a rolled band-shaped type glass fiber material, and a medium-performance filter g comprising an ion-exchange fiber filter formed into a folded-type, as disclosed in Japanese Patent Application Laid-open No. 5-106464.

In FIG. 8, reference character h designates a turbine section of the gas turbine, and reference character i designates a generator driven by the gas turbine a. In the conventional filter unit for the intake air for the gas turbine, it is impossible to sufficiently remove the atmospheric dusts and hence, a reduction in power-generating output from the gas turbine is produced. In addition, the conventional filter unit is of a small dust holding capacity and hence, it is necessary to replace the filter frequently, e.g., 2 to 3 times a year. For this reason, it is desired to propose a high-efficiency and long-life filter unit for an intake air for a gas turbine, which cannot cause a reduction in power-generating output and in which the filter is only required to be replaced at the time of a regular inspection of the gas turbine obliged to be carried out one time a year.

The present inventors have proposed a filter unit of a four-stage type comprising a panel-type demister or a weather louver, a rolled band-shaped type or blow-through type pre-filter, a box-shaped medium-performance filter, and a box-shaped high-performance filter to meet the above demand. However, such filter unit suffers from a problem that its size is increased, resulting in a widened placement space and an increased equipment cost and hence, a countermeasure is required. Therefore, the present inventors have reached a conclusion that a medium-performance filter and a high-performance may be used in combination from the viewpoints of a low pressure drop, a high efficiency and a long life, and they have referred to prior art techniques concerned with the combination of filters. However, each of such prior art techniques has a problem. More specifically, it is disclosed in Japanese Utility Model Application Laid-open No. 562-132715 that for the purpose of reducing the space for placement of a filter unit, a filter paper having a predetermined collection efficiency is placed at a location downstream in a direction of a air flow within a casing, and filter papers having a collection efficiency lower than that of the downstream-side filter paper are placed at multiple stages at a location upstream of the downstream-side filter paper. However, the filter is not reduced in size and hence, it is impossible to achieve the purpose of reducing the placement space.

It is disclosed in Japanese Utility Model Publication No. H3-35373 that for the purpose of removing salt particles, a spacer having voids is interposed between two filter media having a water-repellency. The arrangement of such filter is intended to ensure that even if the salt particles are converted into liquid drops, the liquid drops are permitted to be dropped along a back of the filter media located on an upstream side. However, the thickness of the filter media is increased, and the area of the filter media cannot be increased in order to provide a life of 8,000 hours or more, and additionally, the pressure drop is increased.

It is disclosed in Japanese Patent Application Laid-open No. 554-94176 that for the purpose of provide a high efficiency of filtration (0.1 $\mu$m DOP) of 99.99% or more (so-called ULPA), a filter is formed in two layers, namely, a filter media having an filtration efficiency of 99.97% or more for particles having a particle size of 0.3 $\mu$m is disposed as the layer downstream in a direction of a air flow, and a filter media having a filtration efficiency lower than 99.97 and equal to or higher than 75% for particles having a particle size of 0.3 $\mu$m is disposed as the upstream layer, and the two filter media are folded in a zigzag fashion in closely superposed states. In this case, the filter is formed in the two layers from the viewpoints of the limitation of size and the ease to make, as compared with a filter unit formed at two stages. In this filter, however, it is an object to provide a high efficiency, but the life is not taken into consideration. When the filter is used in a gas turbine, the filter is clogged earlier and hence, it is necessary to carry out the replacement of the filter two or three times a year.

Therefore, in order to solve the above-described problems, the present inventors has proposed a high-performance filter for an intake air for a gas turbine, as disclosed in Japanese Patent Application Laid-open No. 7-253029, in which a low-efficiency filter media and a high-efficiency filter media are superposed closely on each other from an upstream side in a direction of a air flow, each of the filter media being formed with a filtering area of 25 to 35 $m^2$, so that the filter media having a filtration efficiency of 10 to 70% for particles having a particle size of 0.3 $\mu$m is disposed as a layer upstream in the air flow direction, and the filter media having a filtration efficiency of 90 to 99.99% for particles having a particle size of 0.3 $\mu$m is disposed as a downstream layer.

For atmospheric dusts used for the first estimation of the filter, an excellent effect indicating a life of 8,000 hours or more has been provided. However, when the re-estimation of the filter has been carried out using other atmospheric dusts, it has been made clear that the pressure drop in the filter unit has been suddenly increased after lapse of about 4,300 hours, resulting in a shorter life. This is because the concentration of the fine dusts having the typical particle size of 0.3 $\mu$m is as very high as about 5 times that of the dusts used in the first estimation and for this reason, the load has been concentrated on the downstream layer.

SUMMARY OF THE INVENTION

Accordingly, it is an object of the present invention to provide a filter for an intake air for a gas turbine and a filter unit using such filter for an intake air for a gas turbine, which can be placed in a reduced space, wherein even if the filter unit is used for high-concentration fine atmospheric dusts having a typical particle size of 0.3 μm, a life of 8,000 hours or more can be ensured, and a reduction in power-generating output can be prevented by alleviating the deposition of the atmospheric dusts in an air compressor or the like in the conventional gas turbine plate, thereby ensuring that it is unnecessary over a long period of time to carry out the washing or cleaning of the air compressor or the like and the replacement of the filter.

To achieve the above object, according to a first aspect and feature of the present invention, there is provided a high-performance filter for an intake air for a gas turbine, comprising a low-efficiency filter media and a high-efficiency filter media superposed closely on each other in the named order from an upstream side in a direction of a air flow, each of the filter media being formed with a filtering area of 20 to 35 m$^2$, so that the filter media having a filtration efficiency of 40 to 70% for particles having a particle size of 0.3 μm is disposed as a layer upstream in the air flow direction, and the filter media having a filtration efficiency of 90 to 99.99% for particles having a particle size of 0.3 μm is disposed as a downstream layer.

The filter media may be folded in a zigzag fashion such that they are corrugated in a direction substantially perpendicular to the direction of the air flow, and preferably, a separator formed of a sheet folded in a corrugated shape may be inserted into each of grooves resulting from the folding of the filter media, the separator being tapered in such a manner that the height of corrugation at a trailing end of the separator in an inserting direction is larger than that at a leading end of the separator. However, the filter media are not limited to the separator type, and may be of a mini-pleat type or a double-pleat type.

In addition, according to a second aspect and feature of the present invention, there is provided a filter unit for an intake air for a gas turbine, comprising dust-removing filters mounted at a plurality stages, the dust-removing filters being a panel-type demister or a weather louver, a rolled band-shaped type or blow-through type pre-filter, and a high-performance filter for an intake air for a gas turbine according to the first feature, respectively, in the named order from an upstream side in a direction of a air flow.

In the above filter unit according to the present invention, the pre-filter nay be of a blow-through type with a filtering area of 2 to 8 m$^2$.

The panel-type demister constituting the filter unit for the intake air for the gas turbine serves to prevent the entrance of rainwater and is conventionally well-known. An example of the panel-type demister conventionally known is a demister made by curling an animal or vegetable fiber and a synthetic fiber into a spring-like state to produce a large number of elastic masses, laminating and bonding the elastic masses to one another by a binder to provide a plate, and encapsulating such plate within a frame. This demister generally has a thickness of 10 to 50 mm and a filtration efficiency (according to JIS Z 8901 test dust No. 8 colorimetric method) of 15 to 60% at a wind velocity 2 m/sec, and indicates a pressure drop of 10 to 100 Pa. Such demister has a feature that the pressure drop is smaller, i.e., a draft resistance is smaller, and a filtering efficiency for water drops is higher. When the demister has been soiled, it may be removed from the frame and washed, whereby the demister can be reused. Of course, a folded-type weather louver formed to prevent the entrance of rainwater by a folded passage can be used in place of the above-described panel-type demister.

The pre-filter constituting the filter unit for the intake air for the gas turbine according to the present invention is of a rolled band-shaped type or a blow-through type. In the rolled band-shaped type, as shown in FIG. 2, a band-shaped filter media 10 made of a glass fiber material is stretched to block an intake air passage 11, and a feed roller 12 having the filter media therearound is placed at an upper location. On the other hand, a take-up roll 13 for taking-up the filter media 10 fed from the feed roller 12 is placed at a lower location. The rolled band-shaped pre-filter is generally made of a material comprising a non-woven fabric made using a glass fiber, a polyester fiber or the like, and has a thickness of 20 to 70 mm, an average fiber diameter of 15 to 60 μm, a pressure drop of 40 to 80 Pa at a wind velocity of 2.5 m/sec, a filtering efficiency (according to JIS Z 8901 test dust No. 15, mass concentration measurement method) of 60 to 90% and a dust holding capacity of 500 to 1,300 g/m$^2$.

However, when the rolled band-shaped type is used, the maintenance of a taking-up drive device is required and hence, in order to form the pre-filter into a complete maintenance-free type, the blow-through type having a widened filtering area is preferred.

In the blow-through type, as shown in FIGS. 3 to 5, a filter media 20 is formed into a shape with a large number of bags 21 mounted continuously, and is attached by screws 26 to a frame 25 through a head portion 24 having a plurality of crosspieces 23 and matched to an opening 22 of the filter media 20.

The filter media of these pre-filter is made of a material comprising a dry non-woven fabric of an organic fiber such as polyester, acryl and the like, and has an average thickness of 5 to 25 mm, an average fiber diameter of 5 to 60 μm, basis weight of 50 to 600 g/m$^2$, a pressure drop of 20 to 300 Pa at a wind velocity of 2.5 m/sec, and an efficiency (according to JIS Z 8901 test dust No. 15, mass concentration mesurement method) of 60 to 99%. The blow-through type pre-filter having a filtering area of 2 to 8 m$^2$ and an outer size of Length (L) 592 mm×Wide (W) 592 mm×Depth (D) 500 mm is made using this filter media. However, the shape of the blow-through type pre-filter is not limited, and the blow-through type pre-filter may be of any shape ensuring that a desired filtering area can be provided.

If the filtering area is smaller than 2 m$^2$, a desired life of the filter unit is not obtained. If the filtering area exceeds 8 m$^2$, the pressure drop is higher and hence, such a filtering area exceeds 8 m$^2$ is not preferred. Therefore, the filtering area is preferable to be in a range of 2 to 8 m$^2$.

The performance of this filter is such that a pressure drop at an air flow rate of 50 m$^3$/min is 20 to 80 Pa, an efficiency (according to JISz8901 test dust No. 15, mass concentration mesurement method) is 60 to 99%, and a dust holding capacity is 500 to 4,000 g.

The high-performance filter for the intake air for the gas turbine according to the present invention is made using the combination of a low-efficiency filter media and a high-efficiency filter media. It is preferable to use a high-performance filter media having a filtration efficiency of 90 to 99.99% for particles having a particle size of 0.3 μm.

The reason is as follows: If the particle size is lower than 90%, it is impossible to prevent the deposition of dusts in a compressor in the gas turbine. If the particle size exceeds 99.99%, it is effective for preventing the deposition of dusts, but problems of an increase in pressure drop and a reduction in life are arisen.

It is preferable to use a low-efficiency filter media having a filtration efficiency of 40 to 70% for particles having a particle size of $0.3 \mu m$. The reason is as follows: If the particle size is lower than 40%, as in a case of atmospheric dusts including fine dusts of high-concentration typically having a particle size of $0.3 \mu m$, the burden on the high-efficiency filter media located at the downstream location is increased. If the particle size exceeds 70%, a problem of early clogging of the filter media is arisen.

The high-efficiency filter media 30a and the low-efficiency filter media 30b are closely superposed on each other and folded in a zigzag fashion, so that they are corrugated it the direction substantially perpendicular to the direction of flowing of the intake air in order to increase the filtering area. The filter media are incorporated into a frame 31 with a seal material 32 interposed therebetween, and a separator 33 formed of a sheet folded in a corrugated shape is inserted into each of grooves resulting from the folding of the filter media.

By using a so-called inclined separator formed into a tapered shape with a height H1 of corrugation at a trailing end in an inserting direction being larger than that H2 at a leading end in the inserting direction, the filter can be made to have a high performance at a larger air flow rate, as compared with the use of a separator having a height of corrugation uniform over the entire length as in a case of a usual separator.

In such high-performance filter, in general, the total thickness of the filter media is in a range of 0.4 to 2.0 mm: basis weight is in a range of 100 to 200 $g/m^2$; the pressure drop at a wind velocity of 5.3 cm/sec is in a range of 50 to 450 Pa: and the efficiency (0.3 $\mu m$ DOP) is in a range of 90 to 99.9%. The separator is made of a material such as a foil of metal such as aluminum, stainless and the like, a sheet of paper such as a craft, a synthetic fiber and the like, a synthetic resin film such as a polyarylate, a polyethylene-terephthalate and the like. The filter media are folded in the zigzag fashion, and the separator is inserted into each of the grooves resulting form the folding of the filter media. When the high-performance filter made in the above manner has an outside size of L610 mm×W610 mm×D290 mm, it has a filtering area in a range of 25 to 35 $m^2$. When the filter has an outside size of L594 mm×W594 mm×D290 mm, it has a filtering area in a range of 20 to 30 $m^2$. If the filtering area is smaller than 20 $m^2$, the pressure drop is higher, resulting in a shorter life. If the filtering area exceeds 35 $m^2$, a problem that the spacing between the filter media cannot be maintained is encountered. Therefore, it is preferable that the filtering area is in a range of 20 to 35 $m^2$.

The performance of this filter is such that a pressure drop at an air flow rate of 50 $m^3$/min is in a range of 150 to 450 Pa; an efficiency (0.3 $\mu m$ DOP) is in a range of 90 to 99.99%, and a dust holding capacity is in a range of 1,000 to 3,000 g.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of embodiments with reference to the accompanying drawings.

Figure 1:
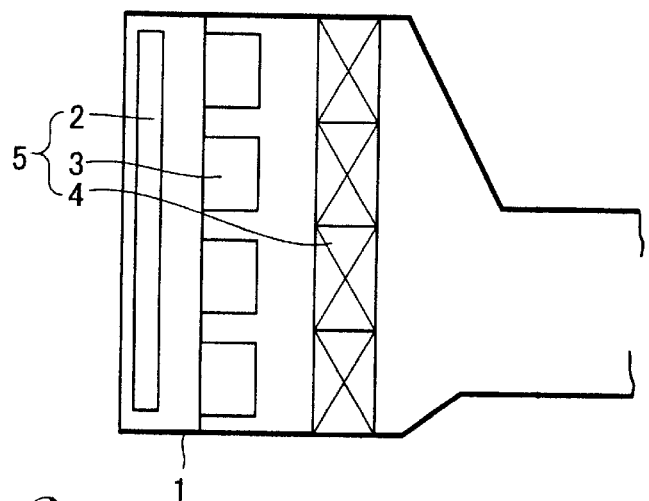
FIG. 1 is an illustration of the arrangement of a filter unit for an intake air for a gas turbine according to the present invention.
Figure 2:
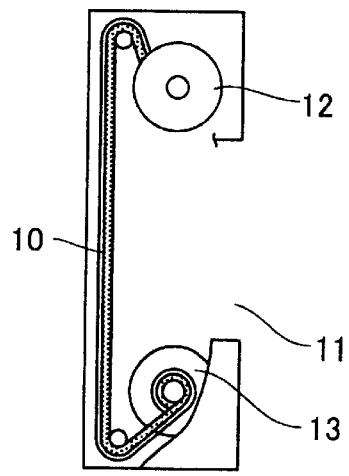
FIG. 2 is a partially cutaway front view of a rolled band-shaped type pre-filter.
Figure 3:
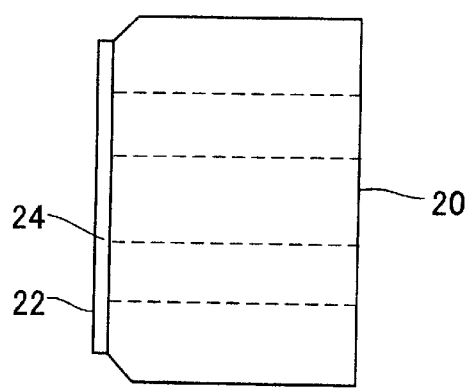
FIG. 3 is a side view of a filter media of a blow-through type pre-filter.
Figure 4:
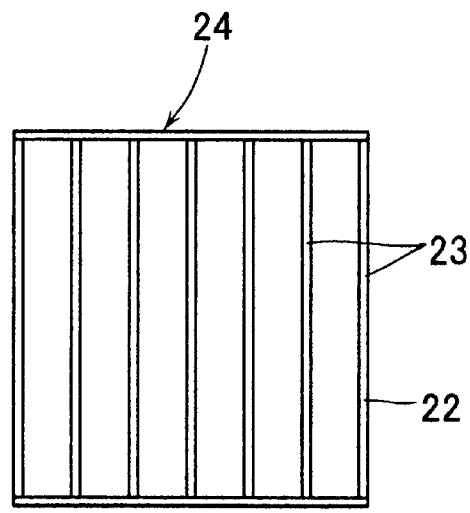
FIG. 4 is a front view of ahead portion of the filter media.
Figure 5:
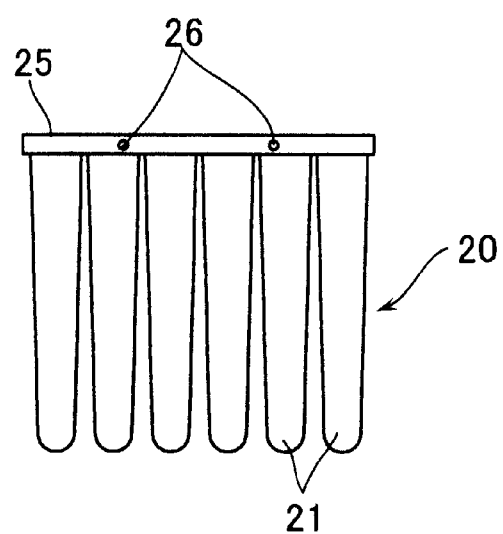
FIG. 5 is a plane view of the blow-through type pre-filter.
Figure 6:
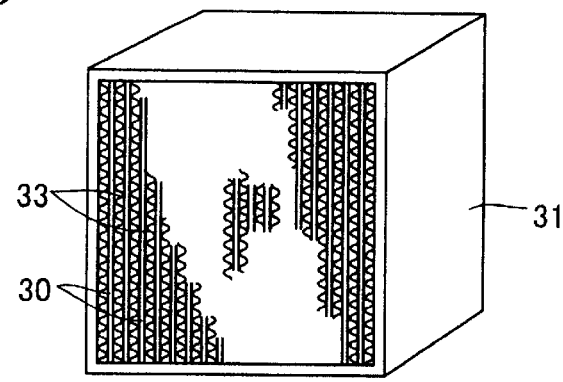
FIG. 6 is a perspective view of a high-performance filter.
Figure 7:
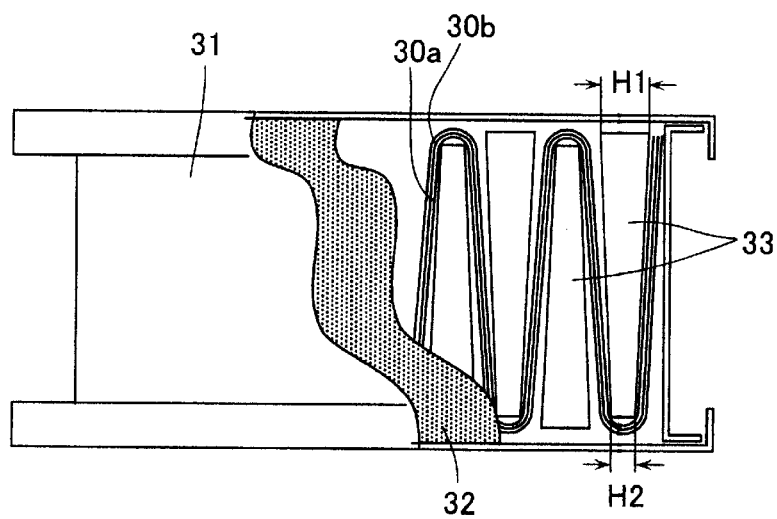
FIG. 7 is a partially cutaway plan view of the high-performance filter.
Figure 8:
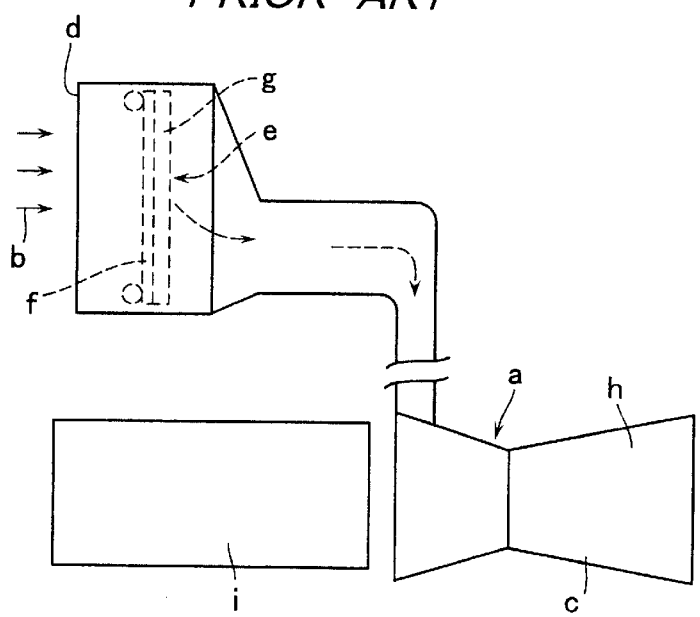
FIG. 8 is an illustration of the arrangement of a prior art filter unit for an intake air for a gas turbine.

FIG. 1 shows an embodiment of a filter unit for an intake air for a gas turbine. A three-stage filter unit 5 is mounted within a casing 1 placed in an intake air duct in a gas turbine in order to remove, from an intake air, dusts harmful to the continuous operation of the gas turbine, and comprises a weather louver 2, a blow-through type pre-filter 3 and a high-performance filter 4 according to the present invention.

The single weather louver 2 is placed within the casing 1 and formed into an outside size of about L2,600 mm×W3, 300 mm×about D200 mm by folding a metal plate substantially into a <-shape in section to prevent the entrance of rainwater, and indicates a pressure drop of about 20 Pa with respect to a used wind velocity of about 2.5 m/sec, a collection efficiency of 88% (by weight) for rainwater drops.

The twenty pre-filters 3 axe placed at four stages and in five rows within the casing 1 and each formed at a filtering area of 4 $m^2$/one filter and an outside size of L592 mm×W592 mm×D500 mm by folding a filter media of a non-woven fabric made of a polyester fiber (having an average diameter of 19 $\mu m$, an average basis weight of 330 $g/m^2$ and an average thickness of 18 mm) to produce six crests, and fixing the filter media in a metal frame. The performance of the pre-filter is such that an initial pressure drop is about 60 Pa with respect to a used wind velocity of about 50 $m^3$/min, and a collection efficiency (according to JIS Z 8901 test dust No. 15, mass concentration mesurement method) is 98%.

The twenty high-performance filters 4 are placed at four stages and in five rows within the casing 1, and each formed at a filtering area of 25 $m^2$ and an outside size of L610 mm×W610 mm×D290 mm by closely superposing a filter media of a glass fiber paper material having a collection efficiency of about 40% for particles having a particle size of 0.3 $\mu m$ and a filter media of a glass fiber paper material having a collection efficiency of about 97%for particles having a particle size of 0.3 $\mu m$, with the former filter media being on an upstream side and the latter filter media being on a downstream side in a direction of flowing of an intake air, inserting a separator made of an aluminum foil into each of grooves resulting from the folding of the two filter materials in the zigzag fashion. The performance of the high-performance filter is such that an initial pressure drop is about 250 Pa with respect to the used wind velocity of about 50 $m^3$/min, and a collection efficiency is 97% (by number concentration mesurement for particles of 0.3 $\mu m$).

The filter unit 5 for the intake air for the gas turbine, comprised of the weather louver 2, the pre-filters 3 and the high-performance filters 4 in the present embodiment was subjected to the following test along with a filter unit for an intake air used as a comparative example, comprising a similar weather louver 2, pre-filters 3 and high-performance filters each formed by closely superposing a filter media of a glass fiber paper material having a collection efficiency of about 15% for particles having a particle size of 0.3 μm and a filter media of a glass fiber paper material having a collection efficiency of about 97% for particles having a particle size of 0.3 μm, with the former filter media being on an upstream side and the latter filter media being on a downstream side. The open air containing fine high-concentration dusts having an average weight of about 0.13 mg/m$^3$, a particle size of 0.3 to 0.5 μm and an average number of 500,000/0.1 cf was allowed to flow continuously through the filter unit according to the present invention and the filter unit as the comparative example, and an reduction in output from the gas turbine, the life (a time until the pressure drop reached 686 Pa) of the filter and the like in such period of flowing of the open air were estimated. The arrangements of the two intake air filter units used in the test are shown in Table 1 below, and results of the test are shown in Table 2 below.

TABLE 1

|  | Rain-water filter | Pre-filter | High-performance filter (two-layers) | |
|---|---|---|---|---|
|  |  |  | On upstream side | On downstream side |
| Embodiment | Panel type | Blow-through type | Collection efficiency of about 40% for particles having particle size of 0.3 μm | Collection efficiency of about 97% for particles having particle size of 0.3 μm |
| Comparative Example | Panel type | Blow-through type | Collection efficiency of about 15% for particles having particle size of 0.3 μm | Collection efficiency of about 97% for particles having particle size 0.3 μm |

TABLE 2

|  | Reduction in output from gas turbine | Space-saving, and maintenance | Life of filter |
|---|---|---|---|
| Embodiment | There is little reduction | Good | Longer (more than 8,500 hours) |
| Comparative Example | There is little reduction | Good | Shorter (4,300 hours) |

As apparent from Table 2, in the arrangement of the comparative example, good results are provided in the point of the prevention of the reduction in output from the gas turbine and in the points of the space-saving and the maintenance, but when the filter unit in the comparative example is used in an environment containing a high concentration of fine dusts having a particle size represented by 0.3 μm, the life is as short as 4,300 hours and hence, it is necessary to replace the filter about two times a year.

On the contrast, in the arrangement of the embodiment of the present invention, even when it is used in the environment containing a high concentration of fine dusts having a particle size represented by 0.3 μm, the prevention of the reduction in output from the gas turbine and the space-saving are provided, and the maintenance-free life more than 8,000 hours (corresponding to one year or more) can be achieved.

As described above, the use of the filter unit for the intake air for the gas turbine according to the present invention ensures that it is only necessary to replace the filter in an annual regular inspection specified in the law and hence, the operations for the maintenance such as the replacement of the filter and the cleaning of a compressor can be alleviated.

In addition, the filter having the high collection efficiency and represented by an HEPA filter (the so-called high-performance filter) is used and hence, the reduction in output from the gas turbine due to deposition of atmospheric dusts in the open air is inhibited, and the filter unit for the intake air is compact and thus, the space-saving is provided.

Although the embodiments of the present invention have been described in detail, it will be understood that the present invention is not limited to the above-described embodiments, and various modifications in design may be made without departing from the spirit and scope of the invention defined in claims.

What is claimed is:

1. A high-performance filter for an intake air for a gas turbine, comprising a low-efficiency filter media and a high-efficiency filter media superposed closely on each other in the named order from an upstream side in a direction of a air flow, each of the filter media being formed with a filtering area of 20 to 35 m$^2$, so that the filter media having a filtration efficiency of 40 to 70% for particles having a particle size of 0.3 μm is disposed as a layer upstream in the air flow direction, and the filter media having a filtration efficiency of 90 to 99.99% for particles having a particle size of 0.3 μm is disposed as a downstream layer.

2. A high-performance filter for an intake air for a gas turbine according to claim 1, wherein said filter media are folded in a zigzag fashion such that they are corrugated in a direction substantially perpendicular to the direction of the air flow, and a separator formed of a sheet folded in a corrugated shape is inserted into each of grooves resulting from the folding of said filter media, said separator being tapered in such a manner that the height of corrugation at a trailing end of the separator in an inserting direction is larger than that at a leading end of the separator.

3. A filter unit for an intake air for a gas turbine comprising dust-removing filters mounted at a plurality of stages, said dust-removing filters being a panel demister or a weather louver, a rolled band-shaped or blow-through pre-filter, and a high-performance filter for an intake air for a gas turbine according to claim 1, respectively in the named order from an upstream side in a direction of an air flow.

4. A filter unit for an intake air for a gas turbine according to claim 3, wherein said pre-filter is a blow-through pre-filter with a filtering area of 2 to 8 m$^2$.

* * * * *